Nov. 7, 1961  S. M. SHOBERT  3,007,497
REINFORCED PLASTIC RODS AND METHOD OF FABRICATING THE SAME
Filed Jan. 23, 1956

INVENTOR.
SAMUEL M. SHOBERT
BY
Lockwood, Galt, Woodard, & Smith
ATTORNEYS

United States Patent Office 3,007,497
Patented Nov. 7, 1961

3,007,497
REINFORCED PLASTIC RODS AND METHOD
OF FABRICATING THE SAME
Samuel M. Shobert, 16050 Ireland Road,
Mishawaka, Ind.
Filed Jan. 23, 1956, Ser. No. 560,563
2 Claims. (Cl. 138—125)

The present invention relates to improvements in reinforced plastic rods and method of fabricating the same, and more particularly to rods of tubular configuration having uniform wall thickness.

In Meek Patent No. 2,684,318, issued July 20, 1954, there is disclosed and claimed a method for fabricating glass reinforced plastic rods of solid cross-section. In Francis Patent No. 2,602,766, issued July 8, 1952, there is disclosed a method for fabricating hollow glass reinforced plastic rods. These hollow rods are fabricated by first arranging a plurality of glass threads into a longitudinal bundle, inserting a mandrel into the central portion of the bundle so as to provide a core therefor, and finally braiding glass thread around the outer surface of the thread bundle. This braided bundle is thereafter immersed in resin which is cured to bond firmly the threads together in self-supporting form. The mandrel is thereupon removed, thereby providing a hollow center for the finished rod.

The hollow rod achieved by this method comprises essentially a plurality of longitudinally extending tubularly arranged glass threads having a braid on the outer surface thereof. There is no physical interweaving or entanglement between the braid covering and the longitudinal threads, whereby the finished product is subject to peeling or delamination by reason of the longitudinal threads and braid separating.

This hollow rod is further subject to the objection that the wall thickness in cross-section is not uniform. This is due to the fact that when the mandrel is inserted into the loose bundle, it is not possible to distribute evenly these threads around the circumference of the mandrel. Thus there results more threads on one side of the mandrel than on the other, which leads to the non-uniform wall thickness.

Since rods of this character are frequently used as fishing rods which require a particular flexural characteristic, it becomes obvious that if the rod non-uniformly varies in dimensional characteristics, the flexural characteristics will correspondingly vary. Still further, since fishing rods are subjected to violent bending or flexing action, it is apparent that any tendency for the rod to delaminate is aggravated, leading to eventual damage of the rod.

The present invention provides an improved product as well as a new method for fabricating the product.

It is therefore an object of this invention to provide a method of fabricating reinforced plastic rods of hollow configuration which are not subject to peeling or delamination.

It is another object of this invention to provide a method of fabricating reinforced plastic rods of tubular configuration wherein the cross-sectional wall thickness of the rod is uniform.

It is still another object of this invention to provide a reinforced plastic rod of tubular configuration having both helical and longitudinal threads or strands which are physically interlocked.

It is yet another object of this invention to provide a reinforced plastic rod of tubular configuration wherein the rod is of uniform thickness in the wall section thereof.

Other objects will become apparent as the description proceeds.

To the accomplishment of the above and related objects, my invention may be embodied in the forms illustrated in the accompanying drawings, attention being called to the fact, however, that the drawings are illustrative only, and that specific change may be made in the specific constructions illustrated and described, so long as the scope of the appended claims is not violated.

Figure 1:
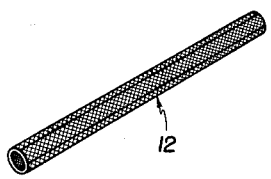
FIG. 1 is a perspective illustration of one embodiment of the finished product of this invention.
Figure 2:
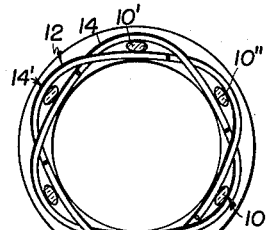
FIG. 2 is a cross-sectional illustration thereof.
Figure 3:
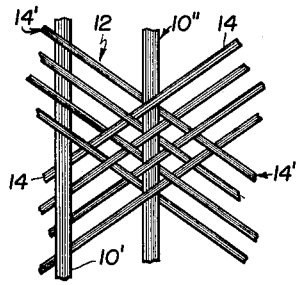
FIG. 3 is an enlarged view of a small area of the interleaved threads.

Referring to the drawings, and more particularly to FIGS. 1, 2 and 3, the hollow rod is fabricated of substantially the same materials as are used in the Meek Patent No. 2,684,318 and the Francis Patent No. 2,602,-766. The rod comprises, as seen in FIG. 2, a plurality of longitudinally extending threads 10 which are parallel and circumferentially spaced in a circumferential pattern. In one embodiment of this invention, these threads 10 are straight and parallel, but as will become apparent from the following description, they may have a gradual spiral in accordance with a design desiderata. While these threads 10 are arranged in a symmetrical hexagonal pattern, as illustrated in FIG. 2, this invention is not so limited since the number of threads 10 may vary from one to as many as are desired. These threads 10 preferably are of the glass yarn type, each thread being composed of a mutiplicity of tiny elongated fibres which, in effect, when bundled together from the final continuous length of thread. Thus, the thread 10 in FIG. 2 is chosen as having substantial cross-section. Also this thread 10 may consist of a plurality of glass strands or threads, without departing from the scope of this invention.

A braided reinforcement, indicated generally by the reference numeral 12, is interwoven with the threads 10 as illustrated. The braid 12 may be formed by means of any conventional braiding machine similar to the one disclosed in the Francis Patent No. 2,602,766. By following the individual strands of the braid in FIGS. 1 and 2, it will at once become apparent how the threads 10 10'—10'' are interlocked inside the braid 12. For example, note in FIG. 2 that the strand 14 passes on the outside of the threads 10', but on the inside of the adjacent thread 10''. This strand alternately and successively passes over and under the adjacent threads 10, 10' and 10''. The other strands 14' of the braid pass on the inside of the threads 10' but on the outside of adjacent threads 10''.

The threads 10 and braid 12 are imbedded in a self-supporting plastic or resin whereby the finished rod is constituted of a reinforced plastic material. The particular plastic material or resin used are conventional to the industry, and therefore need not be further elaborated.

Figure 6:
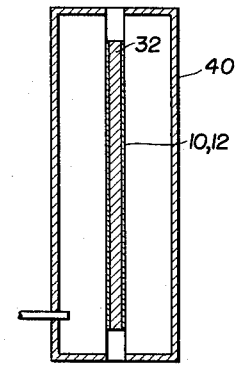
FIG. 6 is a vertical section of a curing oven used in one of the final steps of fabricating the hollow rod.
Figure 4:
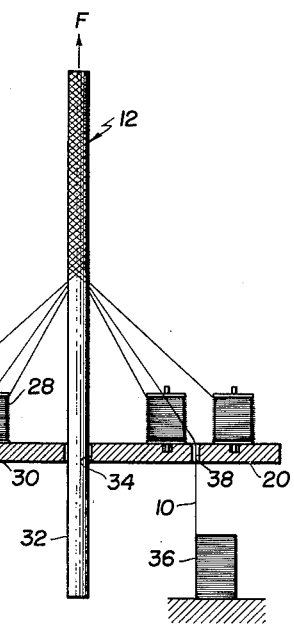
FIG. 4 is a diagrammatic illustration partly in vertical section of an apparatus used in the fabrication of the tubular rod.
Figure 5:
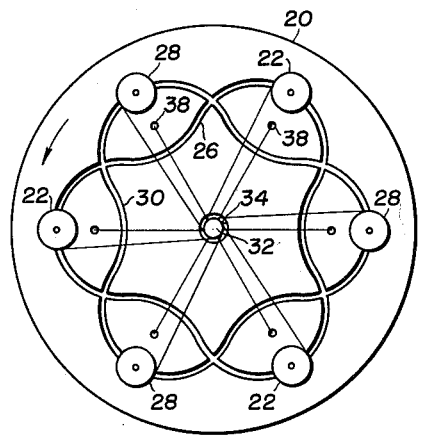
FIG. 5 is a top plan view, in diagrammatic form, of the arrangement of FIG. 4.

Referring to FIGS. 4, 5 and 6, the method of forming the threads and strands in proper order will be described. A conventional braiding machine as illustrated in FIGS. 4 and 5 carries on its supporting table 20 a suitable number (six, in the present instance) of spools 22 of glass strands. The spools 22 are supported on suitable spindles 24 which fit into the guide grooves 26, which grooves follow a circumferential undulating pattern as illustrated in FIG. 5. There are two series of spools on the table 20, the spools 22 being characterized herein as the outer spools, while the spools 28 are considered as the inner spools. The only reason for this characterization is to demonstrate more clearly by reference to FIG. 5 that there are two different undulating grooves 26 and 30 which cross over symmetrically as illustrated.

A mandrel 32, cylindrically shaped, is passed through a clearance opening 34 in the table 20 as shown. An operator can hold this mandrel 32 is position and operate it in the proper manner, as will be explained in the following.

Beneath the table 20 are disposed a plurality (in the present instance, six) of spools 36 of glass thread. The thread from each spool 36 is passed through a receptive clearance opening 38 in the table 20 and attached by some suitable means to the mandrel 32. Thus, as the mandrel 32 is pulled upwardly in the direction of the arrow F, thread is pulled off each spool 36. The threads 10 of FIGS. 2 and 3 will now be recognized as being the same as the thread contained on the spools 36, while the braid 12 is the same as that contained on the spools 22 and 28.

Strands from the respective spools 22 and 28 are individually affixed to the mandrel 32 by some suitable means whereupon the apparatus is ready for operation.

In operation, the mandrel 32 is slowly raised in the direction of the arrow F, while the spools 22 and 28 are moved at a uniform rate of speed through their guiding grooves 26 and 30, respectively. Considering for a moment the motion of one spool 22, it will be seen that it will pass outside and inside alternate threads 10, while at the same time forming an interleaving braid with the strands from the spool 28. The spool 28 works oppositely so that in the finished product there are an equal number of strands disposed on the outside of each longitudinal thread 10 and on the inside. The mandrel 32 is continuously raised at a uniform rate until the braiding operation is completed for the entire length thereof. The individual threads and strands are then cut, thereby leaving the mandrel 32 with a braid covering of glass thread and strands.

The mandrel with its covering is next immersed, or wetted by some suitable means, in a bath of liquid resin material, which material is conventionally used in the glass-fishing-rod art. Making certain that all of the strands and threads are thoroughly impregnated with this resin material, the mandrel with its impregnated covering is placed in a curing mold 40. The mold is heated by the used of steam or the like until the resin material is completely cured. Thereafter, the mandrel 32 and the braid, longitudinal threads and resin covering 10, 12 is removed from the mold. Then, as the last step, the mandrel 32 is removed. The resultant product is a hollow, self-supporting tube which is composed of interleaved reinforcement which extends both longitudinally and helically in a symmetrical cross-sectional product as illustrated in FIG. 2.

From the foregoing it will be appreciated that the longitudinal threads 10 cannot peel or delaminate from the braid 12. This is due to the fact that all the threads and strands are physically interleaved or braided together, whereby delamination is impossible. It will also be appreciated that in cross-sectional dimension, the rod wall is of symmetrical and substantially uniform thickness. In the illustration of FIG. 2, there are six longitudinal threads arranged in a hexagonal pattern. These threads extend for the entire length of the rod, thereby providing uniform longitudinal flexural characteristics throughout the rod length. The braid 12, of course, imparts torsional strength and resilience to the finished rod.

This uniform product is achieved each time a rod is made according to the described method, and it will be noted that no particular skill is required for obtaining this product.

While the invention has been disclosed in connection with the fabrication of glass reinforced plastic rods, which are suitable for use as fishing rods, it is obvious that thread or yarn material other than glass fiber may be used without departing from the scope of this invention. It will also be noted that the invention is described in connection with the fabrication of a hollow rod of uniform diameter throughout its length; however, it is obvious that by using a tapered mandrel 32, a hollow tapered rod may be easily achieved without complicating the techniques of fabrication.

What is claimed is:

1. A hollow reinforced plastic rod comprising an elongated, tubular shaped element of self-supporting, hardened and cured resin, said element having a solid wall of uniform thickness about its entire circumference, a reinforcement of glass strands and threads embedded within and retained by said resin for imparting both torsional and flexural strength thereto, said reinforcement comprising a plurality of axially extending circumferentially spaced glass threads, glass strands each extending in the form of a helix in one circumferential direction alternately over and under successive axially extending threads, other glass strands each extending in the form of a helix in the opposite circumferential direction alternately over and under said axially extending threads and alternately over and under the successive strands of the first-mentioned helix, all of said glass threads being arranged symmetrical to the longitudinal axis of said rod throughout said wall to provide uniform shape and flexural characteristics, said axially extending threads being disposed between the strands of the helices substantially longitudinally along corresponding intersecting points of said strands.

2. A hollow reinforced plastic rod of uniform wall thickness circumferentially thereof consisting of a plurality of axially extending circumferentially spaced flexible glass threads, said threads being symmetrically arranged around said rod, the circumferential spacing between said threads being substantially equal, flexible glass strands extending in the form of a helix in one circumferential direction alternately over and under successive axially extending threads, flexible glass strands extending in the form of a helix in the opposite circumferential direction alternately under and over said axially extending threads, said axially extending threads lying in between the strands of the helices, said helices being interleaved successively under and over each other to thereby be interlocked together with said axially extending threads substantially longitudinally along corresponding intersecting points of said strands, and a solid wall of self-supporting cured resin annular in cross section, said wall being of uniform radial thickness circumferentially thereof, said axially extending threads and said strands being embedded in said resin.

References Cited in the file of this patent

UNITED STATES PATENTS

| | | |
|---|---|---|
| 1,093,915 | Cobb | Apr. 12, 1914 |
| 1,104,777 | Cobb | July 28, 1914 |
| 1,104,778 | Cobb | July 28, 1914 |
| 1,341,987 | Kline | June 1, 1920 |
| 1,978,211 | Loughead | Oct. 23, 1934 |
| 2,114,274 | Huppert | Apr. 12, 1938 |
| 2,467,999 | Stephens | Apr. 19, 1949 |
| 2,690,769 | Brown | Oct. 5, 1954 |
| 2,747,616 | de Ganahl | May 29, 1956 |
| 2,749,643 | Scott | June 12, 1956 |

FOREIGN PATENTS

| | | |
|---|---|---|
| 813,978 | France | June 12, 1937 |